United States Patent [19]

Stuck

[11] Patent Number: 5,206,045
[45] Date of Patent: * Apr. 27, 1993

[54] APPARATUS AND METHOD FOR COOKING FOOD PRODUCTS

[75] Inventor: Robert M. Stuck, Clover, S.C.

[73] Assignee: Marshall Air Systems, Inc., Charlotte, N.C.

[*] Notice: The portion of the term of this patent subsequent to Apr. 9, 2008 has been disclaimed.

[21] Appl. No.: 666,256

[22] Filed: Mar. 8, 1991

Related U.S. Application Data

[63] Continuation-in-part of Ser. No. 561,096, Aug. 1, 1990, Pat. No. 5,006,355, Continuation-in-part of Ser. No. 396,945, Aug. 22, 1989, Pat. No. 5,013,563, which is a continuation-in-part of Ser. No. 886,478, May 23, 1986, Pat. No. 4,924,767.

[51] Int. Cl.⁵ .......................... A23L 1/00; A47J 37/00
[52] U.S. Cl. ...................................... 426/243; 99/447; 99/443 C; 426/523
[58] Field of Search ............... 426/243, 523; 99/386, 99/389, 390, 400, 420, 443 C, 444, 447, 404, 433, DIG. 15; 219/411

[56] References Cited

U.S. PATENT DOCUMENTS

| | | | |
|---|---|---|---|
| 1,411,128 | 3/1922 | Strobhart | 99/433 |
| 2,659,800 | 11/1953 | Zander | 99/389 |
| 2,718,188 | 9/1955 | Read et al. | 99/386 |
| 2,775,677 | 12/1956 | Schuetze | 219/445 |
| 2,839,409 | 6/1958 | Matlen | 99/420 |
| 3,023,298 | 2/1962 | Wells | 219/445 |
| 3,229,616 | 1/1966 | Reese | 99/386 |
| 3,294,011 | 12/1966 | Brunson et al. | 99/443 C |
| 3,400,651 | 9/1968 | Hatch | 99/443 C |
| 3,646,879 | 3/1972 | Palmason et al. | 99/443 C |
| 3,693,452 | 9/1972 | McGinley et al. | 99/443 C |
| 3,728,957 | 4/1973 | Polus | 99/447 |
| 3,739,712 | 6/1973 | Duning | 99/386 |
| 3,792,508 | 2/1974 | Simonsen et al. | 17/44.4 |
| 3,835,760 | 9/1974 | Rekesius | 99/443 C |
| 4,154,861 | 5/1979 | Smith | 426/523 |
| 4,176,589 | 12/1979 | Stuck | 99/386 |
| 4,228,635 | 10/1980 | Altenpohl et al. | 17/44.1 |
| 4,351,087 | 9/1982 | Altenpohl et al. | 17/44.1 |
| 4,366,182 | 12/1982 | Kohler et al. | 426/243 |
| 4,372,009 | 2/1983 | Linville | 17/44.1 |
| 4,401,018 | 8/1983 | Berry | 99/443 C |
| 4,413,376 | 11/1983 | Linville | 17/44.1 |
| 4,498,578 | 2/1985 | Altenpohl | 17/44.1 |
| 4,664,923 | 5/1987 | Wagner et al. | 426/233 |
| 4,749,581 | 6/1988 | Gorsuch et al. | 426/523 |
| 4,753,216 | 6/1988 | Nolte | 99/389 |
| 4,924,767 | 5/1990 | Stuck | 99/423 |
| 5,006,355 | 4/1991 | Stuck et al. | 99/447 |

Primary Examiner—George Yeung
Attorney, Agent, or Firm—Shefte, Pinckney & Sawyer

[57] ABSTRACT

Burning and other overcooking of sensitive areas of food products, e.g., a chicken's fatty thigh and back area or a pizza's crust area, is prevented in broiling, baking or otherwise cooking food products on an automated conveyorized commercial restaurant basis by interposing a screen, cover, or like element between a heater panel or other source of cooking energy and the sensitive area of the food product to selectively modify the cooking energy received by the food product's sensitive area in order to subject such area to a modified amount of cooking.

27 Claims, 12 Drawing Sheets

FIG. I

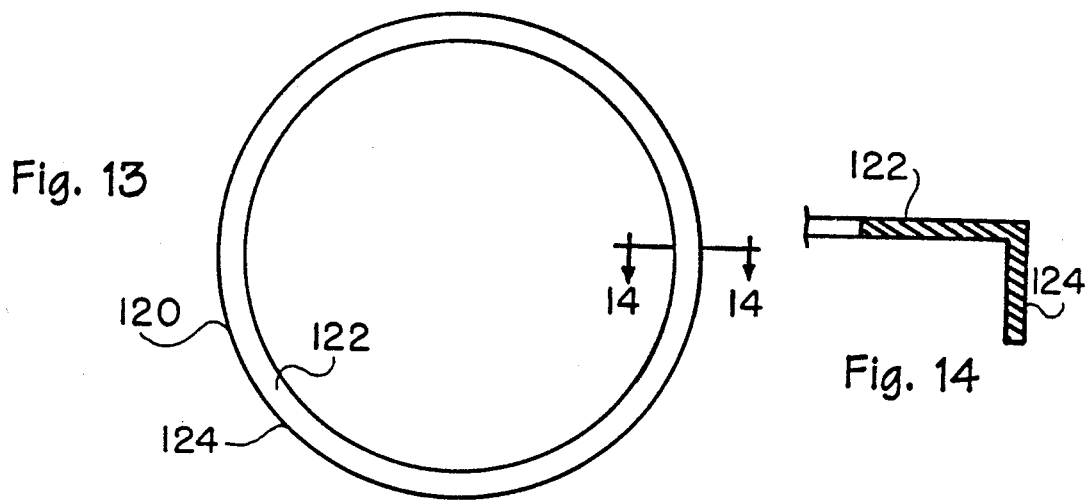
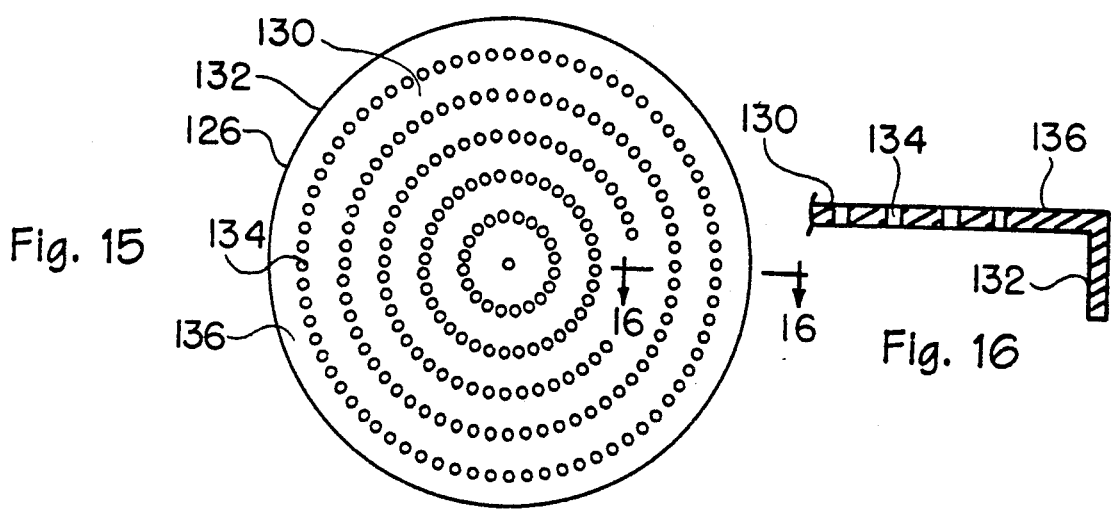
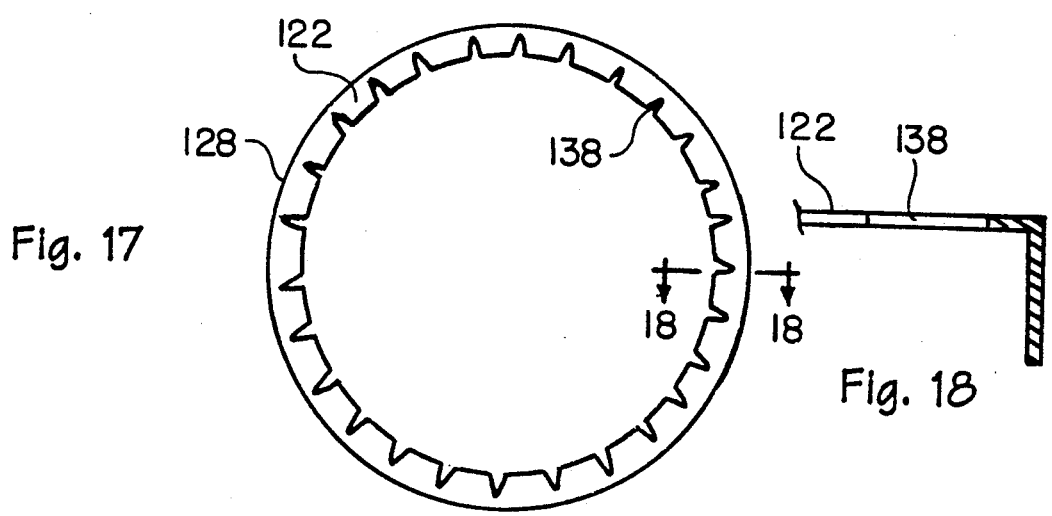

APPARATUS AND METHOD FOR COOKING FOOD PRODUCTS

CROSS REFERENCE TO RELATED APPLICATIONS

This is a continuation-in-part of each of copending U.S. patent application Ser. No. 561,096, filed Aug. 1, 1990, entitled APPARATUS AND METHOD FOR COOKING FOOD PRODUCTS, ESPECIALLY FOR BROILING WHOLE CHICKENS AND OTHER MEATS, now U.S. Pat. No. 5,006,355, and U.S. patent application Ser. No. 396,945, filed Aug. 22, 1989, entitled CONVEYORIZED COOKING METHOD, now U.S. Pat. No. 5,013,563, which is a continuation-in-part of U.S. patent application Ser. No. 886,478, filed May 23, 1986, entitled CONVEYORIZED COOKING APPARATUS, now U.S. Pat. No. 4,924,767, issued May 15, 1990.

BACKGROUND OF THE INVENTION

The present invention relates generally to apparatus and methods for cooking foods, particularly with respect to means and techniques to avoid burning or overcooking of sensitive portions of foods. In its preferred embodiments, the present invention relates more specifically to apparatus and methods for cooking foods on an automated basis, such as in a fast food restaurant, utilizing a conveyor for transporting foods through a heated cooking area.

As the pace of modern society has quickened over recent years, consumer demand has resulted in a proliferation of restaurants of the type and style specializing in rapid preparation and service of limited and typically specialized food menus without the usual restaurant amenities of waiters or waitresses and like services, now commonly referred to as fast-food restaurants. In such restaurant establishments, the speed and rate of food preparation is of the essence. A variety of techniques are employed among various fast-food restaurants to meet this goal. Among others, it is not uncommon for restaurants, particularly in baking or broiling foods, to increase cooking temperature in order to achieve a corresponding decrease in required cooking time. This technique, however, is effective to only a relatively limited extent because the risk of burning or overcooking sensitive portions of food items also increases considerably as the cooking temperature is increased. Thus, the range of food items which fast-food restaurants can effectively prepare and serve has been somewhat limited. For example, pizzas typically require a preparation and cooking time which can typically range from ten to twenty minutes, even more, depending upon the number and type of pizza toppings, the type of pizza crust used, and the cooking temperature. Experience has shown that attempts to increase cooking temperature to achieve a decrease in cooking time commonly result in overcooking and often burning of the exposed outer pizza crust which is not covered with any topping. Accordingly, restaurants specializing in pizzas have been limited in their ability to compete directly with other more traditional fast food establishments.

Over recent years, consumers have also become increasingly concerned with fat and cholesterol content of many common and popular foods, particularly meats. As a result, the rate of consumption of leaner types of meats, particularly chicken and other poultry, has been progressively increasing. At the same time, the methods by which meat and other foods are prepared is now viewed as being of equal importance, oil-based frying of foods being disfavored because it substantially increases the fat content of prepared foods while broiling of foods has become increasingly popular since this preparation method involves no addition of fat to the food.

Disadvantageously, however, the increased popularity of broiling as a food preparation method poses several problems for restaurant owners and others involved in commercial and large-scale preparation of foods. One of the most common commercial food broiling systems utilizes a grill suspended over a heat-generating source, typically a gas-fueled burner. During the cooking of virtually any meat on such a broiling apparatus, fat rendered from the meat falls onto the burner producing a considerable amount of smoke, fire and fumes, all of which must be exhausted from the cooking area. In order to do so in many restaurants and other large-scale food preparation operations, it is necessary to maintain high rates of air exhaust from the cooking area, generally through an exhaust flue and filtering arrangement. While a sufficiently high rate of air exhaust is sufficient in most cases to maintain the cooking and serving areas of restaurants and like establishments substantially free of smoke and fumes, the operators of such establishments incur substantially increased equipment and operational expenses for both the exhaust system and for air conditioning and heating the establishment. Further, various Federal, State and/or local laws and regulations prohibit the direct release of the exhausted effluent of the cooking process into the ambient atmosphere. Accordingly, an air filtering arrangement of a capacity suitable to handle air at the prevailing rate of exhaust must be utilized, additionally increasing the cost of operation. Finally, broiling apparatus of this basic type generally require an operator with a reasonably high level of skill and experience to attend the meat being cooked on the apparatus to insure sufficient cooking without overcooking and burning of the meat.

Various types of automated cooking apparatus have been proposed wherein meat is transported by a continuous conveyor system between vertically-oriented opposed facing burners or other cooking elements to reduce the generation of smoke and fumes while at the same time automating the cooking process. Representative examples of such apparatus are disclosed in U.S. Pat. Nos. 2,718,188 to Read et al; 3,646,879 to Palmason et al; 4,366,182 to Köhler et al; and 4,753,216 to Nolte. Of these apparatus, only the Köhler et al patent contemplates use of such an apparatus for cooking whole chickens or other relatively large irregularly-shaped meat items, the apparatus of the other patents being particularly designed and intended for broiling steaks, chops, hamburgers and the like.

One of the most important criteria for the commercial acceptability of any such apparatus is that the meat item must be uniformly cooked over its entire mass. Since many common meat items are typically of a non-uniform thickness and have a non-uniform distribution of fat (with the possible exception of hamburger patties), this criteria is difficult to reliably achieve on a repeatable regular basis in a commercial setting utilizing an apparatus of the type of the above-identified patents wherein substantially the same amount of cooking heat energy is applied by the opposed burners to all exposed surfaces of the meat item without regard to any inherent irregularities in shape, thickness and fat content of the meat.

This problem would be particularly acute in the broiling of whole chickens as contemplated in the Köhler patent due to the irregular shape of chickens and the irregular distribution of fat, which is concentrated under the skin of the chicken in the region of the thighs and back. In this respect, conventional grill-type broiling apparatus have a notable advantage over conveyorized apparatus of the type of the above-identified patents in that a skilled attendant can regulate the uniformity of cooking of meat items by continuously turning the meat items and changing their position on the grill.

SUMMARY OF THE INVENTION

It is accordingly an object of the present invention to provide an improved apparatus and method for cooking of food products, particularly baking and broiling on an automated conveyorized basis, with the ability to selectively control the uniformity of cooking and minimize the tendency of sensitive portions of foods to burn or otherwise overcook.

Briefly summarized, the cooking apparatus of the present invention basically comprises an arrangement for generating cooking energy, an arrangement for supporting a food product in disposition to receive cooking energy from the generating arrangement, and a suitable arrangement for selectively modifying the cooking energy received by a predetermined portion the food product to be subjected to a modified amount of cooking.

The cooking energy modifying arrangement may comprise a suitable device or member, preferably in the form of a generally flat web, for disposition between the generating arrangement and the food product. In one embodiment, the web may be a mesh screen while in another embodiment it may be in the form of a plate. The modifying arrangement may be arranged to modify the cooking energy in a predetermined cooking area. For example, the food supporting arrangement may comprise a conveyor for transporting food products through a cooking area adjacent the energy generating arrangement, in which embodiments the modifying arrangement is adapted to modify the cooking energy in a predetermined portion of the cooking area.

If the food product being cooked is a pizza or a pizza-type food product having a crust area, the cooking energy modifying arrangement may be in the form of a cover member having a cover portion for disposition in covering relation to the crust area during cooking to reduce cooking energy applied to the crust area in comparison to the cooking energy applied to other portions of the pizza food product. Preferably, in this embodiment, the cover portion is of a generally circular or other annular configuration to correspond to, and be adapted to overlie, a peripheral crust area of a pizza. As necessary or desirable to achieve the preferred energy modification, the cover portion may have openings such as slots formed therein. The cover member may also have a secondary cover portion, preferably perforated, for disposition in covering relation to another area of the pizza or pizza-type food product.

In another embodiment, the apparatus is adapted for cooking whole chicken carcasses, each of which has been severed along its breast bone and opened into a generally flat condition wherein its internal chest and abdominal cavity forms one side of the chicken carcass and its breast, back, wings, thighs and legs form the opposite side of the chicken carcass. As aforementioned, chickens characteristically have a concentration of fatty tissue in the region of the back and thighs. Accordingly, the cooking energy modifying arrangement, e.g., a mesh screen, is arranged to modify the cooking energy applied to the fatty region of the chicken carcass, thereby to avoid overcooking and burning of the chicken in this area.

The present invention also provides a method for cooking food products wherein cooking energy is applied to a food product. The cooking energy applied to a predetermined portion of the food product is selectively modified to subject such portion to a modified amount of cooking, e.g., in the crust area of a pizza or in the fatty region of a whole chicken carcass as above-described. Preferably, this modification of cooking energy is achieved by interposing an energy modifying arrangement, such as a generally flat screen, plate or other web, between the energy source and the food product, e.g., in a predetermined cooking area or as a cover overlying the food product.

BRIEF DESCRIPTION OF THE DRAWINGS

FIG. 13 is a top plan view of the cover member in the cooking apparatus of FIGS. 9 and 10;

FIG. 14 is a vertical cross-sectional view of the cover member of FIG. 13, taken along line 14—14 thereof;

FIG. 15 is a top plan view of an alternative embodiment of cover member for use in the cooking apparatus of FIGS. 9 and 10;

FIG. 16 is a vertical cross-sectional view of the cover member of FIG. 15, taken along line 16—16 thereof;

FIG. 17 is a top plan view of another embodiment of cover member for use in the cooking apparatus of FIGS. 9 and 10; and FIG. 18 is a vertical cross-sectional view of the cover member of FIG. 17, taken along line 18—18 thereof.

DESCRIPTION OF THE PREFERRED EMBODIMENTS

Figure 1:
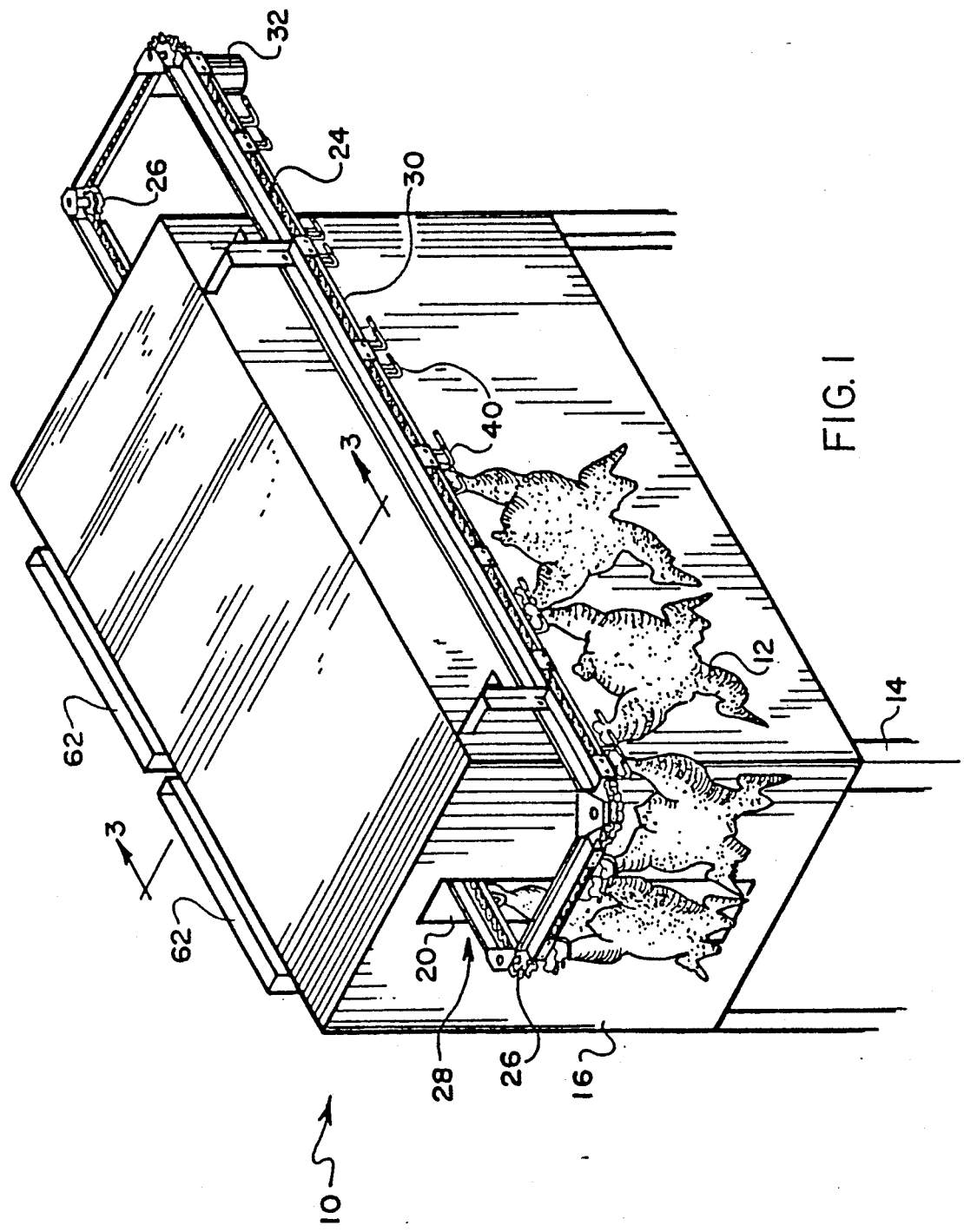
FIG. 1 is a perspective view of a cooking apparatus according to one preferred embodiment of the present invention, taken from one end of the apparatus.
Figure 2:
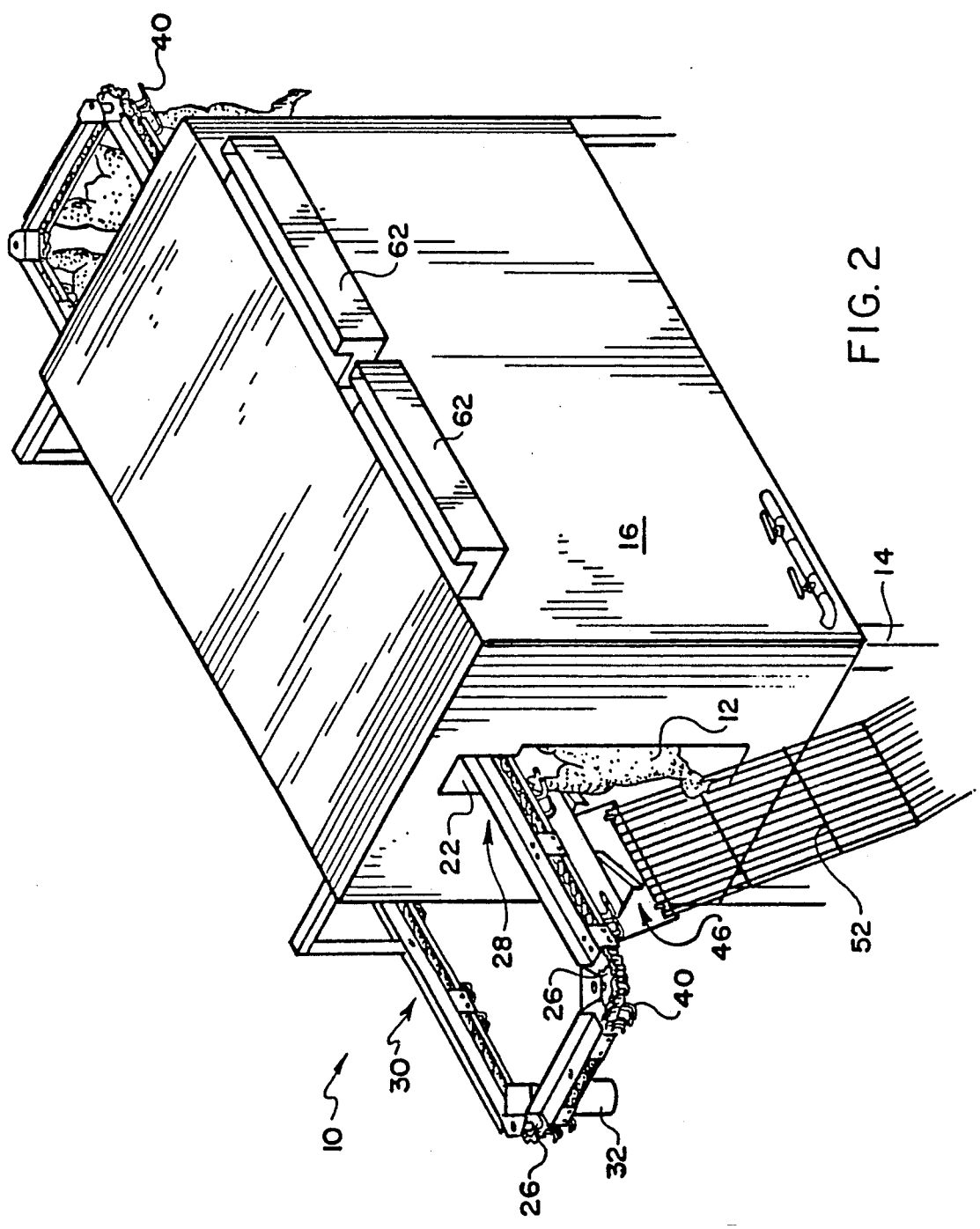
FIG. 2 is another perspective view of the cooking apparatus of FIG. 1, taken from the opposite end of the apparatus.

Referring now to the accompany drawings and initially to FIGS. 1 and 2, the cooking apparatus of the present invention is indicated generally at 10 in an embodiment thereof preferred for automated broiling of whole chicken carcasses 12 on a continuous basis in a commercial restaurant setting However, those persons skilled in the art will readily recognize and understand that the present cooking apparatus and the cooking method performed thereby are susceptible of various other specific embodiments, e.g , for automated continuous broiling, baking or other cooking of various other food products, all of which are intended to be within the scope and substance of the present invention.

As best seen in FIGS. 1 and 2, the present cooking apparatus 10 includes a floor-standing frame 14 which supports an insulated housing 16 defining an interior cooking chamber 18 (FIG. 3) generally in the form of a tunnel extending lengthwise the full length of the housing 16 from an entry opening 20 at one end of the housing 16 to an exit opening 22 at the opposite end of the housing 16. An endless chain-type conveyor 24 is trained about a plurality of sprockets 26 rotatably supported by the housing 16 for traveling movement of the conveyor 24 along an operative cooking run 28 extending lengthwise through the housing 16 generally centrally of the cooking chamber 18 at the upper limit thereof and a return run 30 also extending lengthwise of the housing 16 but outside thereof in the opposite direction. One of the sprockets 26 is operatively driven by a variable speed electric drive motor 32 while the remaining sprockets 26 are mounted for free rotation as idler sprockets.

Figure 3:
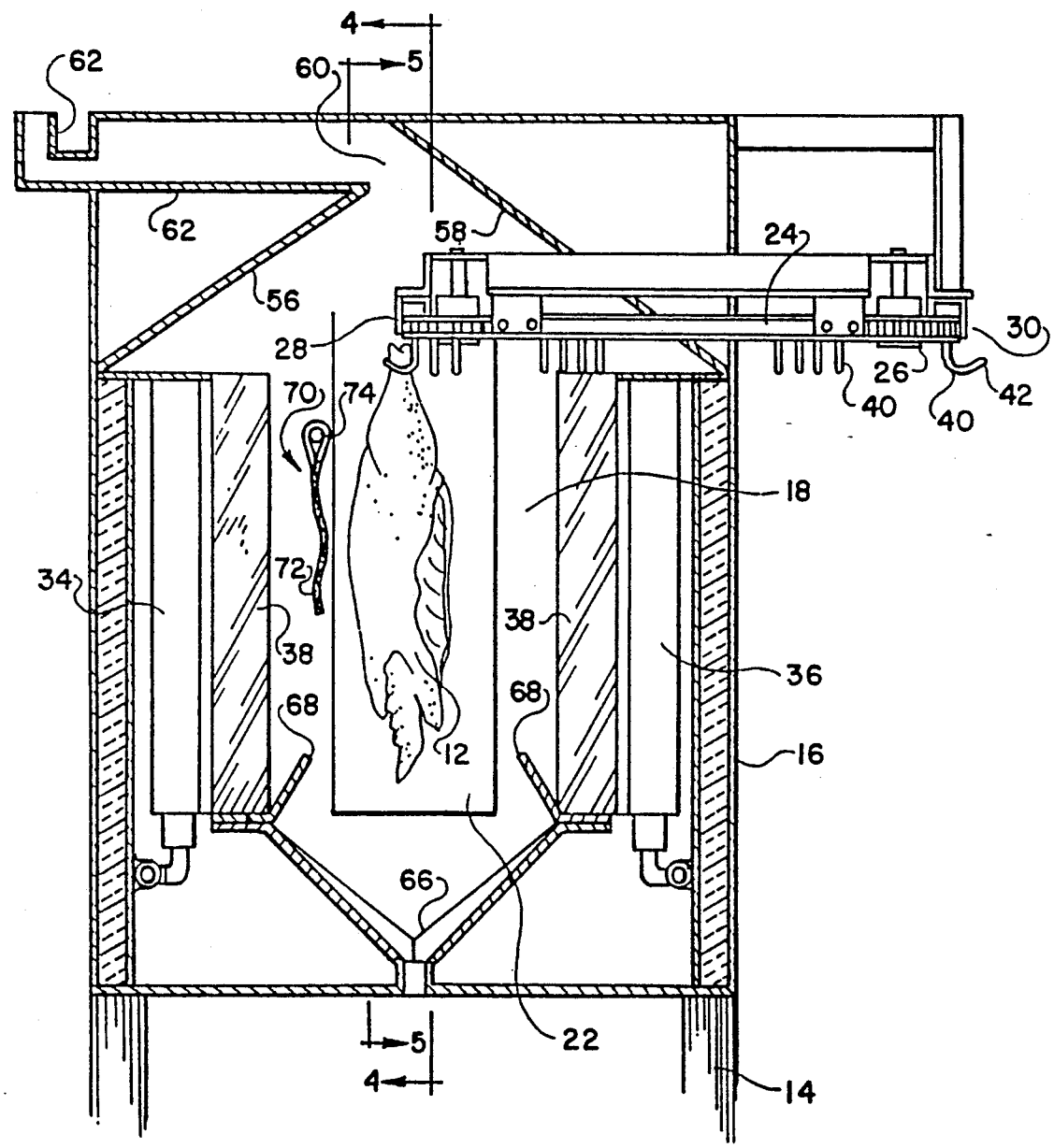
FIG. 3 is an end elevational view, partially in vertical cross-section, of the cooking apparatus of FIG. 1, taken along line 3—3 thereof.
Figure 4:
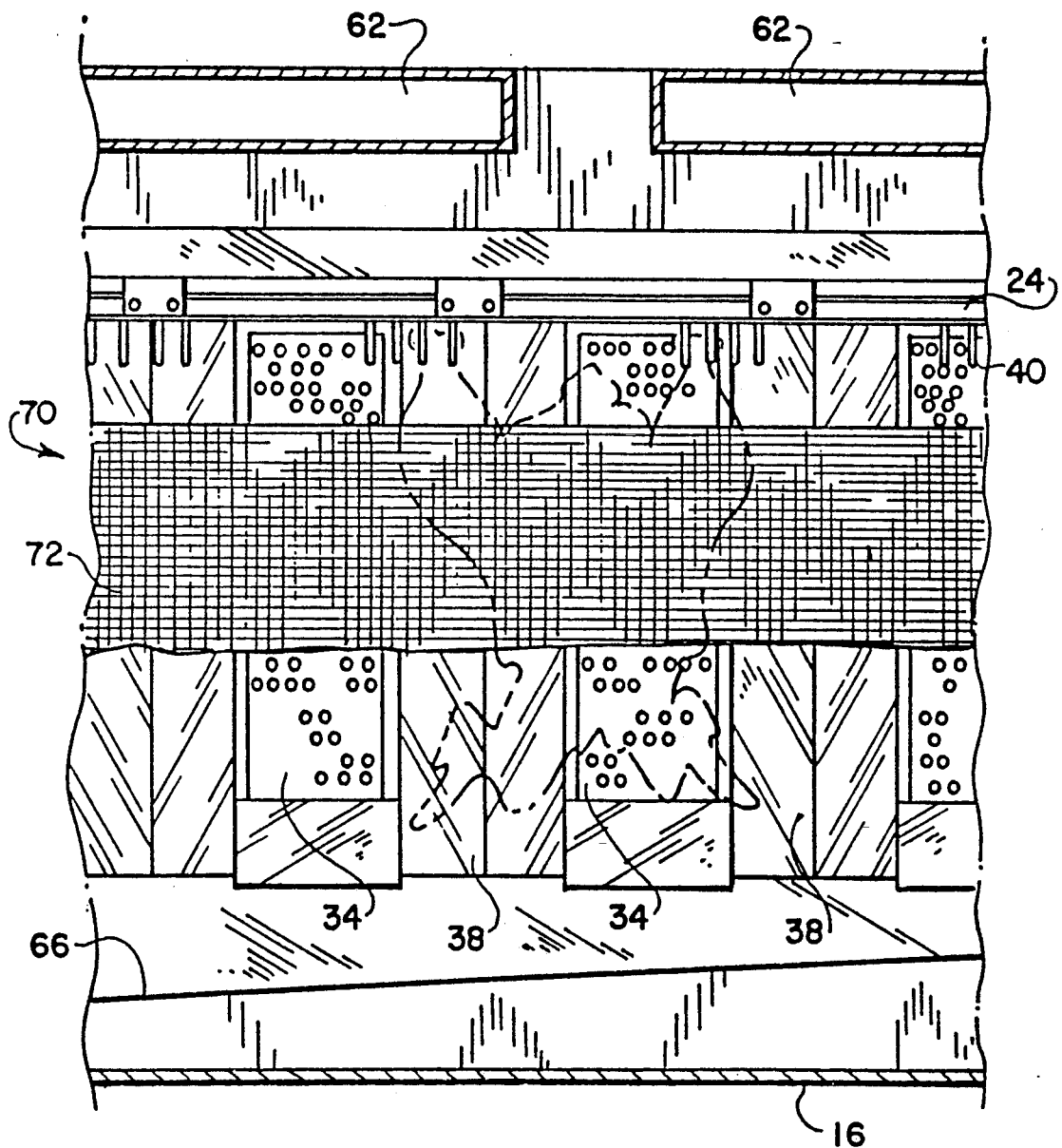
FIG. 4 is a vertical cross-sectional view of the cooking apparatus of FIG. 1, taken lengthwise thereof along line 4—4 of FIG. 3.
Figure 5:
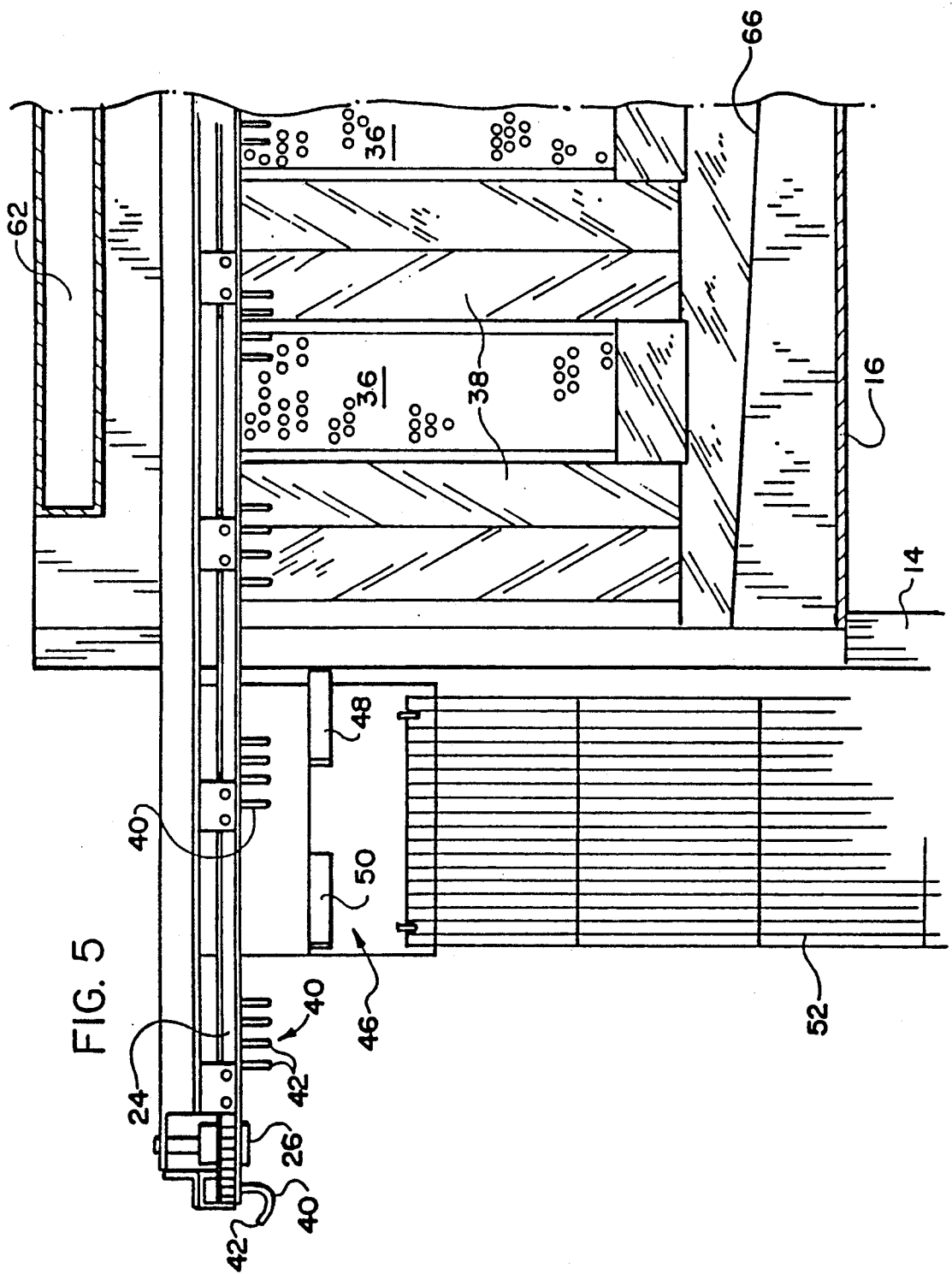
FIG. 5 is another vertical cross-sectional view of the cooking apparatus of FIG. 1, also taken lengthwise thereof along line 5—5 of FIG. 3.

A cooking arrangement is mounted within the housing 16 to generate cooking energy within the cooking chamber 18, the cooking arrangement basically presenting a pair of energy-emitting faces spaced from one another in generally upright laterally-opposed facing relation at opposite sides of the operative run 28 of the conveyor 24 thereby to define the opposite lateral limits of the cooking chamber 18. In the preferred embodiment as illustrated in FIGS. 3-5, the cooking arrangement includes a first plurality of heater panels 34 arranged in generally co-planar laterally-spaced alignment with one another along one side of the cooking chamber 18 and a like plurality of heater panels 36 similarly arranged in laterally-spaced co-planar alignment with one another at the opposite side of the cooking chamber 18. The heater panels 34,36 are of the conventional type having a body of glass-covered ceramic-like material forming the outer face of the panel with a plurality of small orifices being formed in the ceramic body for delivering a mixture of a gaseous fuel, e.g., natural gas, and air for burning at the outer surface or face of the ceramic body.

In this manner, the heater panels 34,36 emit infrared radiation toward one another to heat and cook food products transported through the cooking chamber 18 predominantly by radiant energy but importantly the heater panels 34,36 do not correspondingly elevate the temperature of air within the cooking chamber 18. To enhance this effect, the opposed sets of heater panels 34,36 are arranged in staggered relationship to one another, i.e., each heater panel 34,36 is situated to directly face the abutting frame margins of a pair of the opposing heater panels 34,36 and, further, a generally V-shaped metal reflector plate 38 is disposed along the full extent of the adjacent margins of each adjacent pair of heater panels 34,36 to extend therefrom toward the opposite side of the cooking chamber 18. In this manner, the radiant heat energy emitted by the heater panels 34,36, which otherwise would be substantially absorbed by the frame margins of the opposing heater panels 36,34, is at least partially reflected back toward the central area of the cooking chamber 18.

In the preferred embodiment illustrated, the cooking apparatus 10 is particularly adapted for broiling whole chickens which, after slaughter and evisceration, have been severed along the breast bone and opened into a generally flat condition wherein the rib cage and the other internal portions of the chicken carcass bordering its chest and abdominal cavity form one side of the chicken carcass while the meat portion of the chicken carcass, namely, its breast, back, wings, thighs and legs, form the opposite side of the chicken carcass. Such a chicken carcass is shown at 12 in FIG. 1. It is already known to broil whole chicken carcasses in this opened generally flat condition on a conventional gas-fired grilling apparatus.

Figure 8:
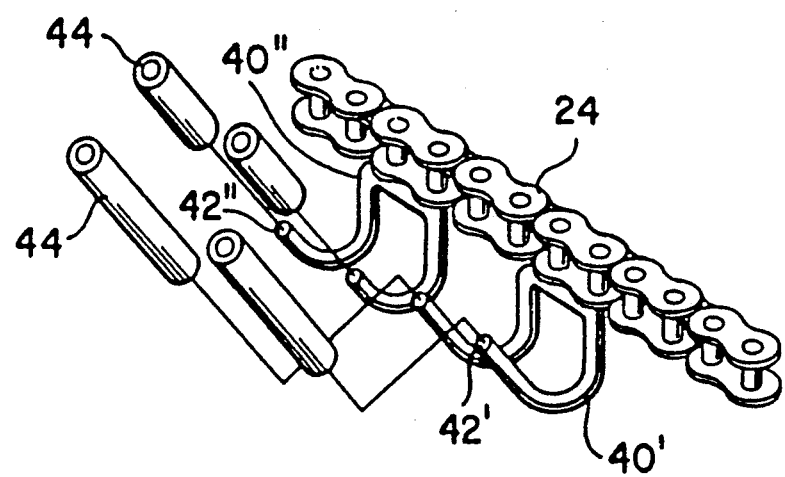
FIG. 8 is a perspective view of a partial length of the conveyor, showing the forks which support chicken thereon.

To facilitate transportation of chicken carcasses 12 in the same opened generally flat condition through the cooking chamber 18 of the present cooking apparatus 10, a plurality of support forks 40 are rigidly affixed to the chain conveyor 24 at spacings along its length for suspending the chicken carcasses 12 by their legs. Specifically, as best seen in FIG. 8, each support fork 40 has a pair of arcuate prongs 42 laterally spaced from one another by a dimension smaller than the typical cross-sectional size of the endmost leg knuckle of a mature chicken yet larger than the cross-sectional size of the narrower adjacent extent of a typical mature chicken leg. The outermost ends of each pair of prongs 42 are unconnected to one another. Thus, a chicken leg may be readily supported by the prongs 42 of each support fork 40 simply by inserting the narrowest portion of the chicken leg between the free ends of the prongs 42 with the endmost knuckle of the chicken leg above the prongs 42 to rest thereon whereby the leg extends downwardly from the fork 40 in depending fashion. The support forks 40 are arranged in pairs along the chain conveyor 24, the individual forks 40 of each pair being spaced from one another by a sufficient dimension to receive the two legs of a prepared chicken carcass when the legs are spread sufficiently from one another to open the carcass into its substantially flat condition as afore-described.

Preferably, the forks 40 are fabricated of metal to provide sturdiness and to resist thermal damage from continuous heating within the cooking chamber 18. However, because the metal material will naturally absorb heat during travel through the cooking chamber 18, bare metal forks 40 will tend to sear the skin of a chicken leg at the points of engagement therewith typically causing the skin to stick to the prongs 42, which makes it difficult to reliably remove the cooked chicken carcasses from the forks 40 without tearing or damaging the skin of the chicken legs. To prevent this occurrence, each prong 42 of each support fork 40 is fitted with an outer sleeve 44 of a stick-resistant plastic material such as Teflon brand tetrafluoroethylene fluorocarbon resin. Such material is commercially available in continuous tubular form and, therefore, may be cut to a desirable length which will readily slide onto a bare prong 42 after heating thereof during travel through the cooking chamber 18. The heat of the prong 42 effectively adheres the plastic sleeve 44 thereto. The arcuate shape of each prong 42 allows the tubular sleeve 44 to conform to the same curvature without the undesirable formation of folds or wrinkles in the plastic sleeve 44. Advantageously, if the protective sleeve 44 becomes cut or otherwise damaged during ongoing operation of the cooking apparatus 10, the sleeve 44 may be readily removed from its prong 42 using a knife or other common cutting tool and quickly replaced with another length of the plastic tubing.

Figure 6:
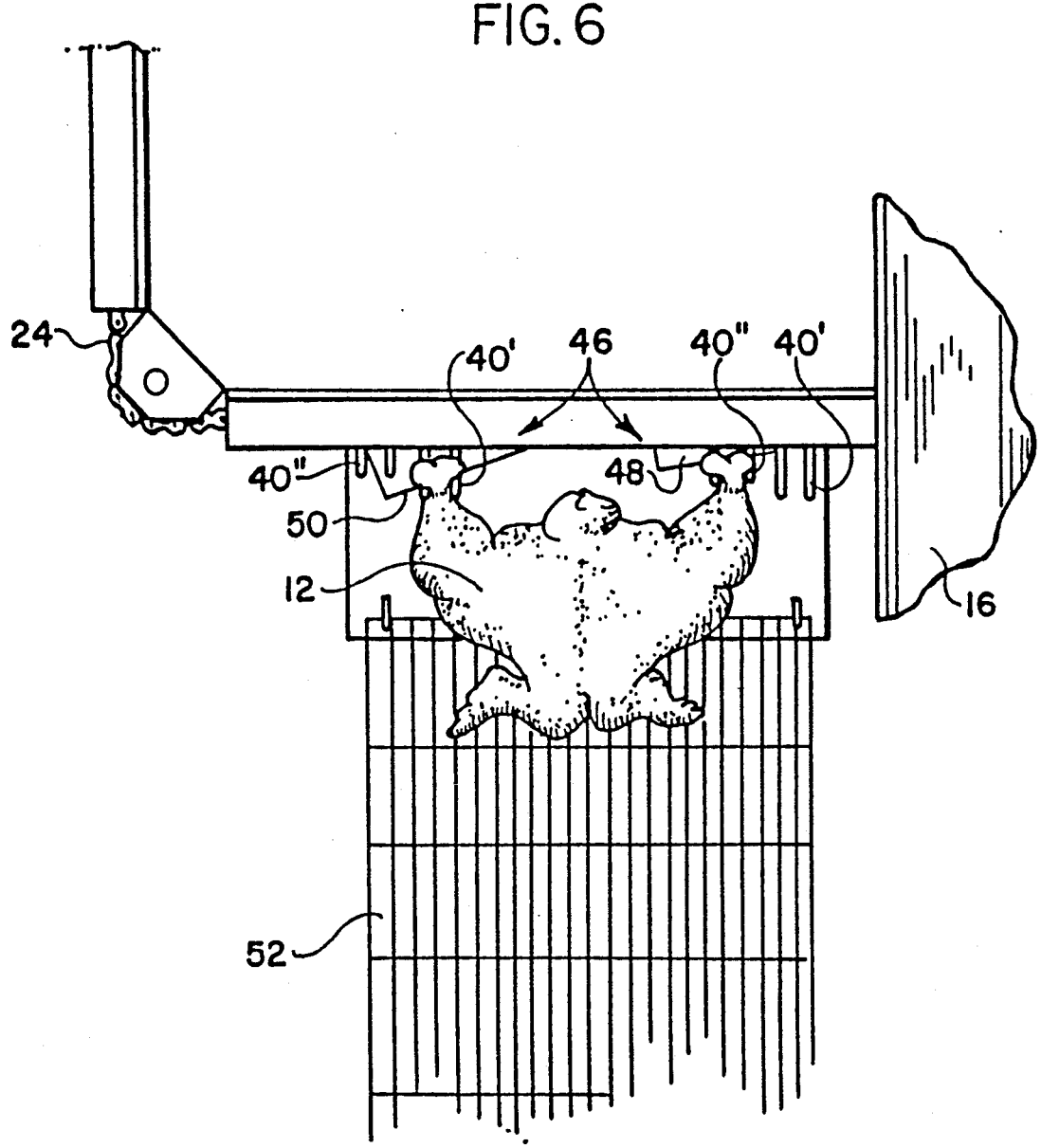
FIG. 6 is a top plan view of the deflector arrangement of the cooking apparatus for removing chickens from the conveyor.

At the exit end of the housing 16, a discharge arrangement, generally indicated at 46 in FIGS. 2 and 6, is mounted in association with the conveyor 24 outwardly of the housing 16 for automatically removing cooked chickens from the support forks 40 of the conveyor 24. As will be understood, after being fully cooked during travel through the cooking chamber 18, the meat of the chickens 12 becomes tender and the joints of the skeletal structure of the chicken become substantially weakened. Accordingly, it is important to simultaneously discharge both legs of a chicken carcass from the pair of forks 40 on which it is supported to avoid possible tearing or separation of the main body of the chicken carcass from one leg which may tend to occur if the full weight of the chicken carcass is supported from only the one leg.

For this purpose, the respective prongs 42 of the support forks 40 of each associated pair are of differing lengths, the prongs 42' of the leading fork 40' of each pair being slightly longer than the prongs 42" of the trailing fork 40" of each associated pair thereof. The discharge arrangement 46 includes a pair of deflector plates 48,50 mounted directly beneath the terminal extent of the operative run 28 of the conveyor 24 immediately outside the exit opening 22 of the housing 16. The deflector plates 48,50 are spaced from one another by substantially the same dimension as the spacing between the support forks 40 of each associated pair thereof. Each deflector plate 48,50 extends at an angle outwardly with respect to the conveyor 24 in the same direction as the prongs 42 extend from the conveyor 24, the first deflector plate 48 in the direction of traveling movement of the conveyor 24 having a lesser outwardly projecting extent than the following deflector plate 50. The angular extension of the deflector plate 48 is selected to be sufficient to discharge a chicken leg from each support fork 40" having shorter prongs 42", but only to move the chicken leg on each support fork 40' having longer prongs 42' outwardly to the terminal extent of the longer prongs 42' without actually discharging the leg from the longer prongs 42'. The greater angular extent of the following deflector plate 50 is selected to be sufficient to subsequently fully discharge a chicken leg from each support fork 40' having longer prongs 42'. Thus, as each associated pair of support forks 40 pass the deflector plates 48,50, the two legs of the chicken 12 supported thereby are simultaneously discharged by the deflector plates 48,50. A wire chute 52 is disposed directly beneath the deflector plates 48,50 and extends downwardly therefrom to a collection basket (not shown) for receiving each discharged chicken 12.

Figure 7:
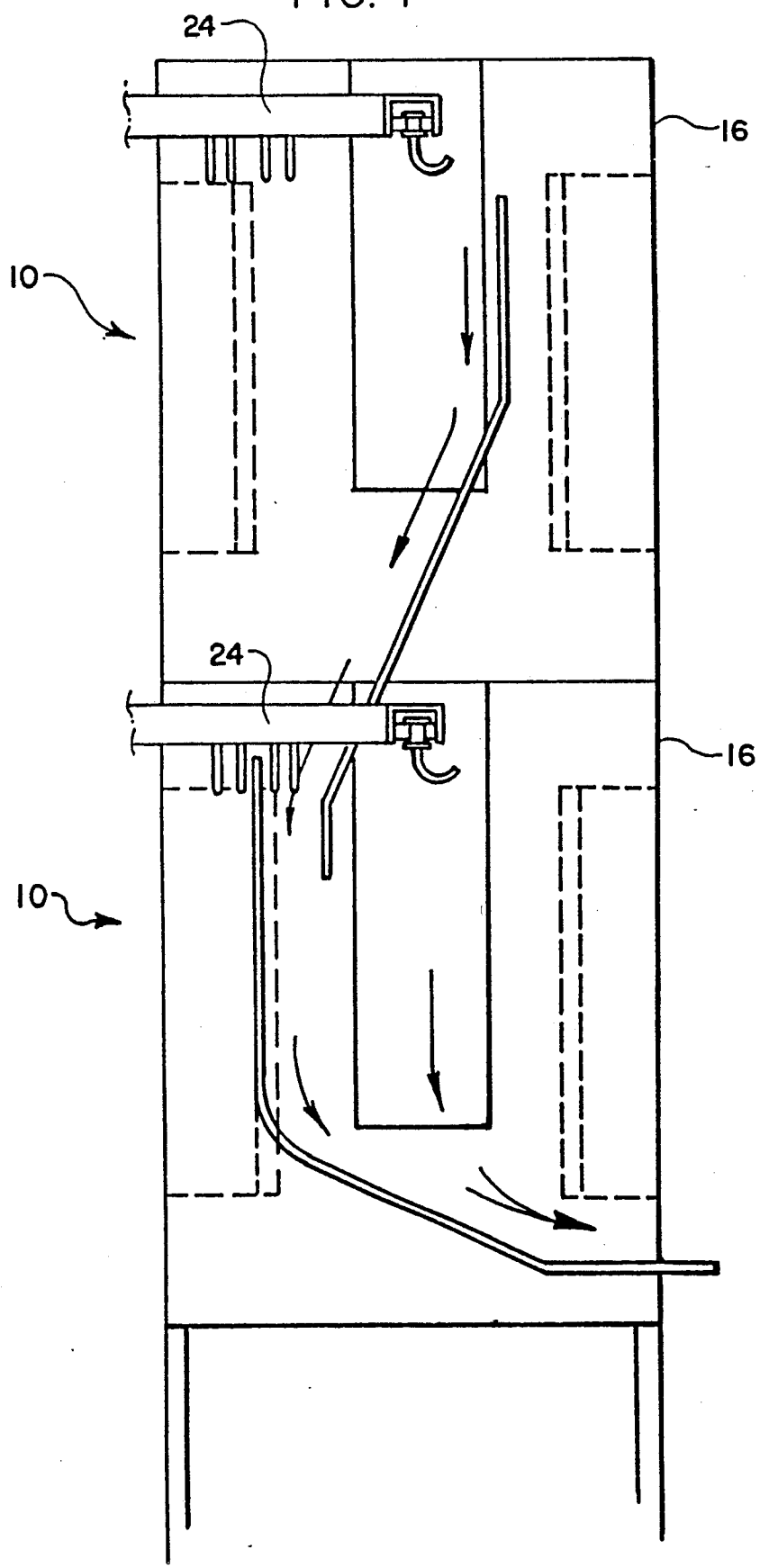
FIG. 7 is an end elevational view of an embodiment of the present invention wherein two of the cooking apparatus of FIG. 1 are arranged in stacked relation to one another.

The interior of the housing 16 is equipped with an exhaust hood formed by a pair of ceiling panels 56,58 which extend angularly upwardly in converging relation from the lengthwise interior side walls of the housing 16 above the respective sets of heater panels 34,36 to a point of convergence directly above the lengthwise central area of the cooking chamber 18, as best seen in FIG. 3. The ceiling panel 56 is formed with a plurality of exhaust openings regularly spaced along its length immediately adjacent its intersection with the ceiling panel 58, each exhaust opening 60 communicating with a respective exhaust duct 62 which extends horizontally outwardly through the adjacent lengthwise side wall of the housing 16 and then upwardly therefrom for communication with suitable ducting or the like for exhaustion to the outside of the restaurant or other establishment in which the apparatus 10 is operated. Advantageously, this described exhaust arrangement, by providing for lateral exhaust of the cooking chamber 18 through the horizontally-extending ducts 60,62, enables the housing 16 of the cooking apparatus to be compactly configured of a rectangularly box-shape which, in turn, enables two or more of the housings 16 to be stacked in superposed relation to one another, as illustrated in FIG. 7, enabling the overall production capacity of the cooking apparatus to be essentially doubled without occupying additional floor space.

Preferably, the exhaust ducts 62 are not directly connected with a fan or other means of forced air movement. Instead, the converging configuration of the ceiling panels 56,58 in conjunction with the exhaust ducts 62 creates a natural chimney effect to produce a continuous convective flow of air into the housing 16, upwardly through the cooking chamber 18, and outwardly through the exhaust openings and ducts 60,62. Preferably, the rate of air flow is no greater than is necessary to sufficiently exhaust any smoke, fumes and other airborne effluent released from the chickens 12 or otherwise generated during the cooking process and also to maintain a generally constant air temperature within the cooking chamber 18 so that all chickens 12 are uniformly cooked to the same degree without regard to the quantity of chickens being cooked or the frequency with which chickens are delivered into the cooking apparatus 10. This aspect of the present cooking apparatus and method is particularly important to the reliable operation of the apparatus 10 in a commercial restaurant setting. As will be understood, it will sometimes be necessary for a restaurant operator to utilize the cooking apparatus 10 for preparing only a relatively few chickens on a relatively infrequent basis during periods of slow customer patronage, but at other times to operate the cooking apparatus at its fullest capacity. It is therefore important to insure that the heating of air within the cooking chamber 18 has a minimal affect on the cooking process under both extremes, which the present apparatus and method achieve.

The interior of the housing 16 may also be provided with a collection trough 66 (FIG. 3) mounted to the end side walls of the housing 16 directly beneath the cooking chamber 18 for collecting grease and the like rendered from the chicken carcasses 12 during the cooking operation. The collection trough 66 is inclined slightly from one end of the housing 16 to the other to drain all such material into a suitable container (not shown) for disposal. Alternatively, the housing 16 may be equipped with removable drawers (not shown) slidably supported in the interior of the housing 1 beneath the cooking chamber 18 for collecting grease while also being removable for cleaning. It is contemplated that the drawers would be inclined to one side of the housing for drainage of collected grease to the outside of the housing 16. Advantageously, both collector embodiments enable the collection of substantially clear, clean chicken grease which can be utilized for other purposes, e.g. the production of cosmetics. The latter embodiment provides the additional advantage of ease of cleaning and maintenance of the cooking apparatus in a commercial restaurant setting.

Since in either case the grease collector is disposed below the heater panels 34,36, the collector is not directly heated by the panels 34,36 and accordingly remains relatively cool, thereby minimizing the production of smoke, fumes and the like when grease and like drippings from the chickens strike the collection trough 66. Thus, although as above-described it is desirable in the operation of the present cooking apparatus 10 to maintain a continuous exhaust air flow through the cooking chamber 18, the rate of such air flow will in all cases be substantially lower than is conventionally required in the operation of a commercial gas-fueled grilling apparatus.

In operation of the cooking apparatus 10, the time required for cooking chickens 12 and the degree to which the chickens are cooked are modulated by means of two basic adjustments in the apparatus 10. First, the pressure or rate at which gaseous fuel is supplied to the heater panels 34 36 may be adjusted through a suitable supply valve in the gas supply system (not shown), which enables the temperature to which chickens 12 are subjected in the cooking chamber 18 to be selectively increased and decreased. Secondly, the operational speed of the conveyor drive motor 32 may be adjusted to selectively increase and decrease the traveling speed of the conveyor 24 which, in turn, determines the cooking time, i.e., the time required for each chicken 12 to travel through the entirety of the cooking chamber 18 between its entrance and exit ends 20,22. Presently, it is considered preferable that these two variables be adjusted to accomplish cooking of each individual chicken 12 within a total cooking time of 20-25 minutes.

As is known, although chicken meat is relatively lean, chickens nevertheless characteristically have a concentration of fatty tissue directly beneath the skin in the region of the thighs and back, particularly where they connect with the breast. It has been discovered that, when the meat-side of a chicken in the opened generally flat condition hereinabove described is exposed directly to a radiant gas-fired burner of the type utilized in the present apparatus for a sufficient continuous period of time to accomplish cooking of the chicken meat, the skin of the chicken in this fatty region becomes severely burnt while the underlying meat does not cook as fully as the meat elsewhere in the chicken, all of which would necessarily make the cooked chicken unsuitable for restaurant sales. Presumably, this condition results from the greater content of fat underlying the chicken skin in the thigh and back region.

To prevent burning of the chicken skin in the fatty region and undercooking of the underlying meat, the present cooking apparatus 10 contemplates that chickens 12 are always to be mounted in the same orientation on the support forks 40 of the conveyor 24 so that the meat side of every chicken faces the same set of heater panels, e.g., the heater panels 34, and in conjunction therewith the present apparatus 10 provides means which selectively modifies the cooking energy of heat emitted from the region or area of each such heater panel 34 directly adjacent the fatty region of chickens 12 as they are transported in the afore-described suspended state through the cooking chamber 18, as generally indicated at 70 in FIGS. 3 and 4. In the preferred embodiment as illustrated, the cooking energy modifying means is in the form of a generally planar or flat web in the form of a wire mesh screen 72 suspended from an elongate support rod 74 which is affixed at its opposite ends to the housing 16 at the lateral side of the entry and exit openings 20,22 adjacent the heater panels 34. The screen 72 is of a dimension in height substantially corresponding to the fatty region of the chickens 12 and is of a sufficient length to extend substantially the full length of the cooking chamber 18. In turn, the mounted disposition of the support rod 74 is selected to interpose the screen 72 directly horizontally between the fatty region of chickens 12 and the horizontally adjacent region of each heater panel 34.

In preliminary testing, it has been discovered that the screen 72 effectively prevents undesirable burning of the skin in the fatty region of chickens cooked in the apparatus 10 while also achieving a more thorough cooking of the underlying meat than is accomplished by the same apparatus without the screen 72. The particular reasons and manner in which the screen 72 accomplishes this result are unknown, but it is believed that the screen 72 acts generally in the nature of a filter to partially "filter" infrared rays emitted from the laterally adjacent regions of the heater panels 34. It is accordingly contemplated that other suitable web-like materials than the wire mesh screen 72 may operate equally well to achieve the described results.

It has also been discovered that the shoulder region of the chickens 12, i.e. the region whereat the wings adjoin the breast, sometimes does not cook as rapidly as the other meaty regions of the chickens. Accordingly, to promote thorough cooking of the shoulder region and prevent undercooking thereof, an upwardly angled metal reflector plate 68 is mounted alongside the lowermost margins of the heater panels 34,36 at each side of the cooking chamber 18 to reflect radiant heat energy emitted by the opposing heater panels 34,36 back toward the shoulder region of the chickens 12 to promote somewhat accelerated cooking of the chickens in such shoulder region.

The significant advantages and improvements of the present cooking apparatus 10 of FIGS. 1-8 and the cooking method it performs may thus be understood. First, it is believed that the present cooking apparatus in its preferred embodiment as described and illustrated represents the first apparatus by which whole chickens can be broiled on a continuous automated conveyorized basis with sufficiently reliable protection against undesirable burning and sufficiently reliable cooking thoroughness to be commercially acceptable for operation in a restaurant, institutional or like setting. In comparison with conventional gas-fueled broiling grills of the type currently in widespread use for the commercial broiling of meats and other foods, the present cooking apparatus eliminates the need for constant manual attention to the cooking process by skilled personnel with equal if not greater consistency in the cooking quality, decreases the overall cooking time required, substantially reduces the smoke, fumes and other airborne effluent generated during the cooking process and, in turn, substantially reduces the air flow and filtering capacity of the associated exhaust system necessary for handling such effluent, all of which makes the present cooking apparatus and method substantially more energy and cost efficient to operate. As a result, differently seasoned and flavored meats and other foods of the same or different types may be broiled side-by-side without risk of cross-contamination of flavors due to the significant reduction of smoke, fumes and flames fueled by rendered grease and drippings characteristic of conventional gas-fueled grilling apparatus.

The present conveyor arrangement with its support forks makes the mounting of chickens on the conveyor simple and easy to accomplish and facilitates the automation of the cooking process by enabling whole chickens to be transported through the apparatus in the open generally flat condition as described, which heretofore has been utilized only when manually broiling chickens on a conventional gas-fueled grill. In conjunction therewith, the deflector plates of the discharge arrangement provide a simple yet reliable means for removing chickens from the forks of the conveyor arrangement without tearing or separation of the chicken carcass. Further, the staggered arrangement of the heater panels together with the provision of the reflector plates and the exhaust arrangement of the present apparatus cooperate to advantageously maintain the air temperature within the cooking chamber essentially constant without regard to the number and frequency at which chickens are delivered into the cooking chamber, whereby all chickens are substantially uniformly cooked whether the apparatus is being operated infrequently at minimal capacity or continuously at full capacity.

While the particular embodiment of the present cooking apparatus and method described and illustrated in FIGS. 1–8 is specifically designed and adapted for cooking whole chickens, it is contemplated that the present apparatus would have equal utility and applicability for broiled cooking of any of a variety of other food products, in particular, other meats such as steaks, fish, etc. In such embodiments, the conveyor 24 would necessarily be modified to include suitable means for suspending such food items from the conveyor during transport through the cooking chamber. For example, a folding basket or grid could be utilized to hold steaks, fish and other generally flat food items in a generally upright condition in general parallel relation between the opposing heater panels 34,36. Alternatively, some form of releasable clamp arrangement could be utilized.

Still further embodiments of the present cooking apparatus and method are also contemplated, as represented for example in the embodiments of FIGS. 9–18.

Figure 9:
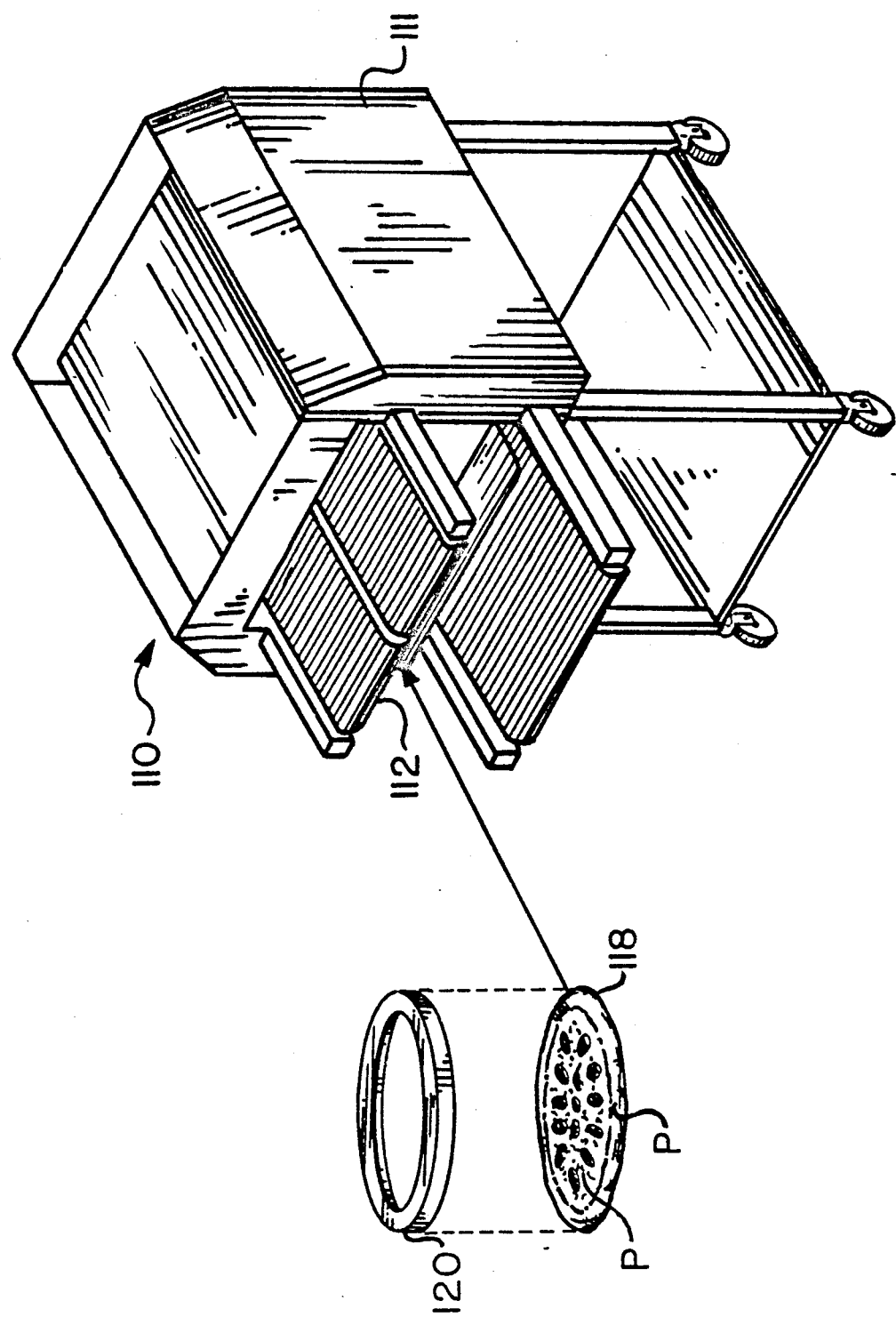
FIG. 9 is a perspective view of another preferred embodiment of cooking apparatus according to the present invention.
Figure 10:
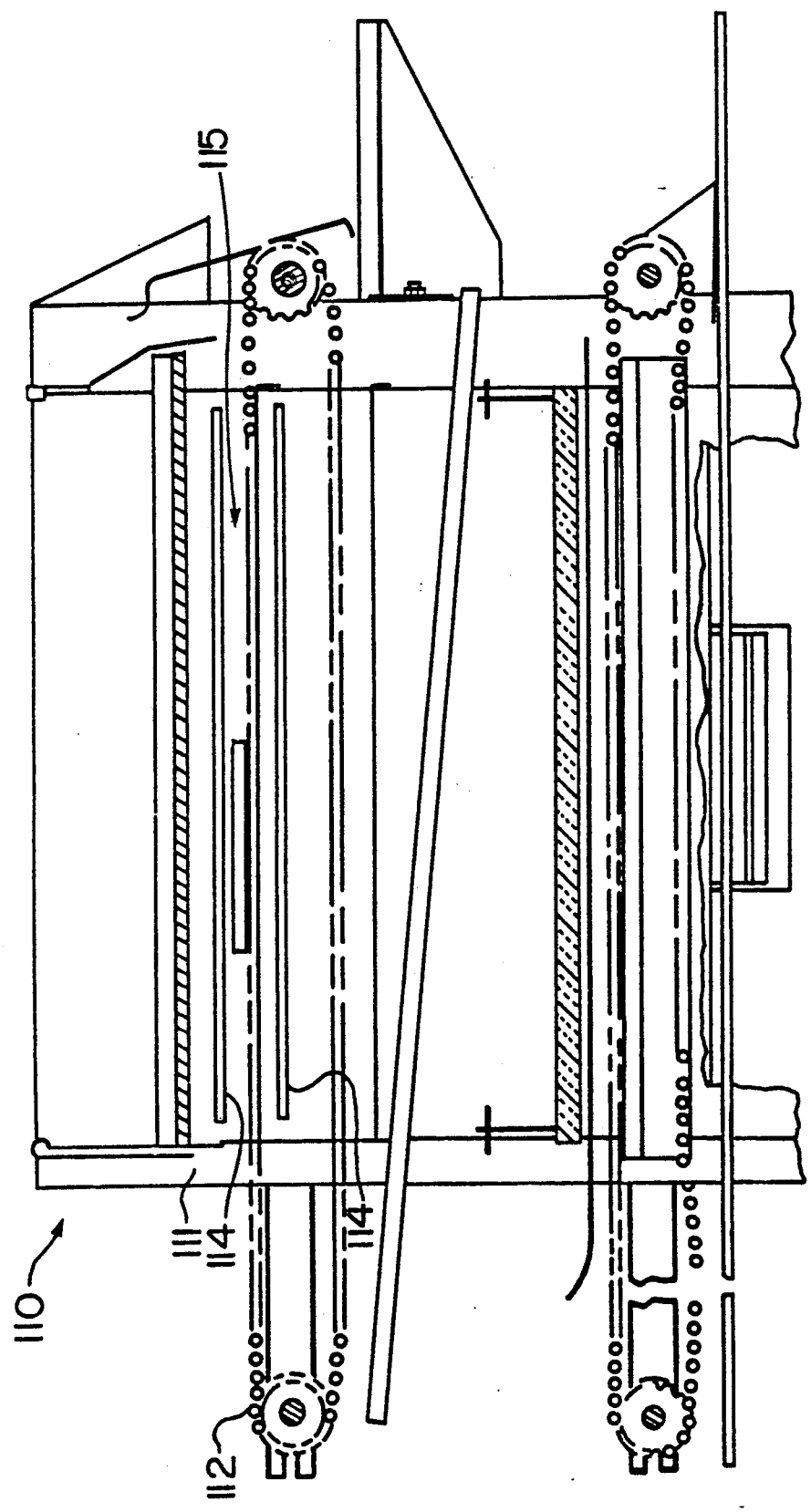
FIG. 10 is a side elevational view, partially in vertical cross-section, of the apparatus of FIG. 9.
Figure 11:
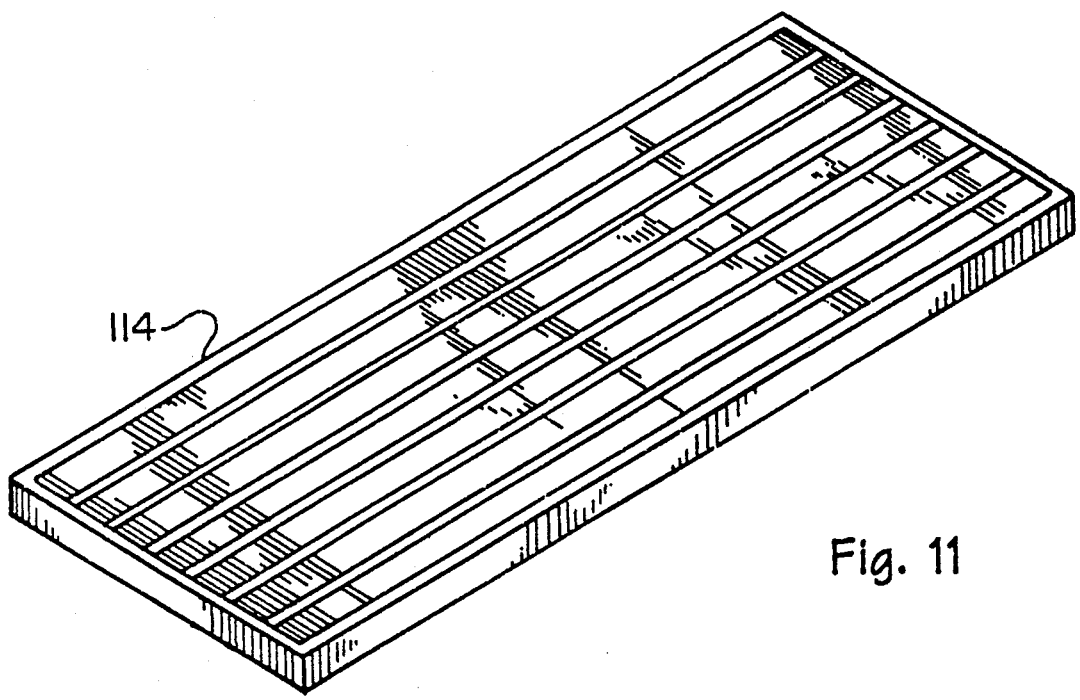
FIG. 11 is a perspective view of a heater used in the apparatus of FIGS. 9 and 10.
Figure 12:
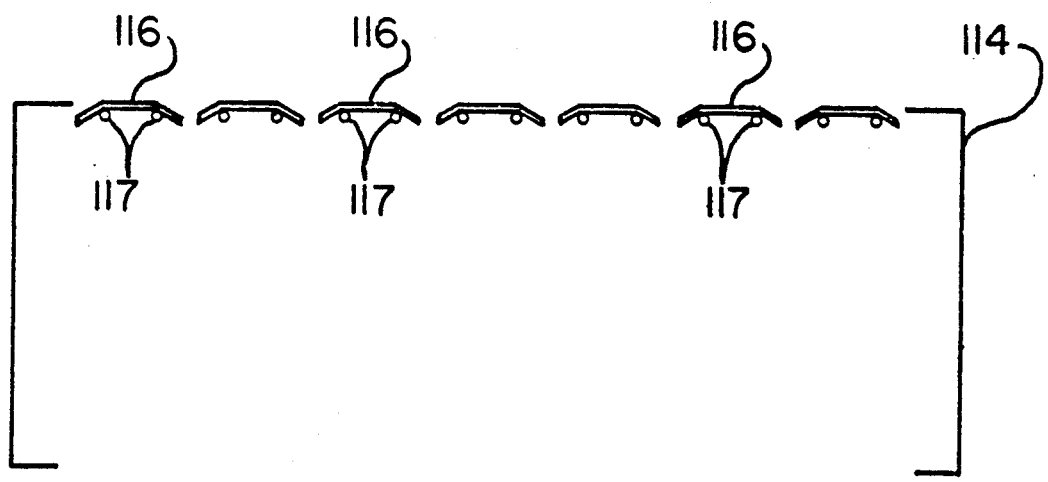
FIG. 12 is a vertical cross-sectional view taken transversely through the heater of FIG. 11.

Referring initially to FIGS. 9 and 10, a cooking apparatus is shown and generally indicated at 110 which has a housing 111 enclosing cooking zone 115 (FIG. 10) for receiving foodstuff to be cooked. A conveyor 112 extends through the cooking zone and is driven for transporting servings of foodstuff therethrough. The apparatus 110 has at least one electrical resistance heater 114 (FIG. 10), preferably two heaters 114, above and below the cooking zone 115, for heating the cooking zone and for cooking foodstuff received therewithin. As will be understood, the heater 114 is subject to fluctuation in thermal demand depending upon the absence and presence of thermal loads imposed by foodstuff in the cooking zone.

In order to accomplish satisfactory cooking of foodstuff even under conditions of fluctuating load, the heater 114 has emission surface means (FIG. 11 and as described more fully hereinafter) defining a planar surface for the emission of thermal energy and electrical resistance means for heating said surface means to a predetermined set point temperature. The surface means and resistance means together are characterized by having low thermal mass such that the rate of temperature decay in the cooking zone within the apparatus 110, upon removal of thermal load therefrom is at least about 0.05 percent of the set point temperature per second.

Thus, the heater 114 has the capability of losing temperature, heat or thermal energy quickly as compared with other heaters. It has been found that the heater 114, used in an apparatus of the present type, is able to "shed" heat quickly enough that repetitive cycles of heating, as in operation under light load conditions, does not result in overcooking or burning of servings of foodstuff. As will be understood, one measure of the capability of the heater to perform as contemplated by this invention is the rate of drop or decrease in temperature over time.

For these purposes, the heater 114 used is formed by a plurality of elongate strips 116 of thin metal from which energy is to be emitted and to the reverse side of which are secured electrical resistance heating wires 117. While the strips 116 and heating wires 117 are secured in a supporting frame and are backed by a radiation reflector for limiting heat loss, the thermal mass of the components which are heated during use is relatively low. It is this low thermal mass which avoids excessive heat build-up.

In particular, heaters which have been successfully used in the present apparatus have been formed using strips 116 which are about two feet long and widths of about one inch and about three inches. To give the strips 116 additional strength at the operating temperatures involved (which may be as high as 1,100° Fahrenheit), they are given a slight concave curvature (viewed from the cooking surface) on the order of a depression of the center of the width of about 0.04 inch in the narrower strip and 0.275 in the wider strip.

When such heaters 114 have been analyzed graphically for performance, it has been discovered that, in the time interval following de-energization of the heater, there is an initial short (5 seconds, approximately) period of temperature rise, followed by an essentially straight line decrease or decay in temperature. As will be appreciated, any straight line function may be mathematically represented by an equation in the general form of $$y = mx + b$$

where y and x represent the values of the usual coordinates, m represents the slope of the line on the graph, and b represents the point on the y coordinate at which the line crosses that coordinate. As applied to the graphs of temperature decay in the heaters of the present invention, y represents the temperature, x the time in seconds, and b the starting or set point temperature. In such graphs, the slope m is a negative value, as temperature is dropping with time. It has been determined that the slope m has a value in the range of from about—0.25 to about—3.0 with the heaters of the present invention.

Expressed differently, the heater 114, as used in the apparatus 110 and the cooking method of this invention, preferably provides, in the apparatus, a rate of temperature decay in the cooking zone upon removal of thermal load therefrom which is in the range of from about 0.05 percent to about 0.3 percent of the set point temperature per second. For a further example, if the set point temperature in the cooking zone is 1,000° Fahrenheit, then the temperature decay rate is at least about one half degree per second and is in a range of up to about 2 degrees per second. Particularly with fast cooking foodstuffs which may present a problem, a decay rate closer to the upper limit of the range will be preferable.

As mentioned hereinabove, the heater 114 emits energy from a planar surface. In accordance with this invention, such emission differs from the "hot ribbon" effect of the heaters of the prior art. Further, a heater as contemplated by this invention provides the capability of controlling the emission in terms of watt density per square inch and location of such emission within the cooking zone area. This is, for some foodstuffs it may be preferable to have a higher watt density (on the order of up to fifteen watts per square inch of heater area) adjacent an entry end of the cooking zone, and a lower watt density (on the order of five watts per square inch) adjacent an exit end of the cooking zone. In any event, it is preferred that the dissipation of heat be in a range of from about five watts to about fifteen watts per square inch of heater area.

One contemplated use of the cooking apparatus 110 is for baking pizzas on an automated conveyorized basis typically by transporting a pizza P, usually supported on or in a cooking pan 118, on the conveyor 11 through the cooking zone 115. However, in initial experimental testing of the apparatus 110 for baking pizzas P made using a refrigerated pre-baked pizza bread dough base topped with tomato-based pizza sauce, cheese and optional vegetable and/or meat toppings, the apparatus 110 tended to severely burn the peripheral crust area of the pizza P when the heaters 114 were operated at sufficiently high temperatures, e.g., in the range of 900 to 1100 degrees Fahrenheit, to reduce the cooking time to a sufficiently short period suitable for use in a fast food restaurant, e.g., 3½ to 4 minutes. Another problem experienced in preliminary experimental testing was that pizzas having different toppings tended to cook to differing degrees at the same setting for heater temperature and conveyor speed, e.g., pizzas topped only with tomato sauce and cheese tending to cook to a considerably greater degree than pizzas topped not only with these ingredients but also a combination of vegetable and meat toppings. As will be understood by those persons skilled in the art, it would be entirely unacceptable from a practical standpoint in a commercial fast food restaurant setting to be required to adjust temperature and/or conveyor speed settings from one type of pizza to another or, alternatively, to provide different cooking apparatus for different types of pizzas.

The basic concept of the present invention, i.e., selectively modifying cooking energy applied to a predetermined portion of the food product being cooked in order to subject such portion to a modified amount of cooking, provides an optimal solution to these problems. As depicted in FIG. 9, in the preferred embodiment of the present invention, a cover member 120 is disposed in covering relation to the burn-prone peripheral crust area P' of a pizza P during transport of the pizza P through the cooking apparatus 110. Preferably, the cover member 120 is in the form of an annular ring configured compatibly to the pizza pan 118 to be supported by the outer perimeter rim of the pan 118 to directly overlie the outer crust area P' of a pizza P on the pan 118. Specifically, the cover member 120 comprises a substantially flat plate-like radially-extending circular top wall 122 and a circular plate-like axial wall 124 depending from the radially outward edge of the top wall 122, whereby the cover member 120 has an inverted L-shaped cross-section, as shown in greater detail in FIGS. 13 and 14. The cover member 120 may be fabricated of any metallic, ceramic or other material suitable for use in cooking implements, e.g., aluminum, steel or another metal and may be optionally coated or treated such as with a non-stick surfacing such as polytetrafluoroethylene.

As with the wire mesh screen 72 in the cooking apparatus and method of FIGS. 1-8, the cover member 120 acts in a manner which is not fully known but which is effective to modify the cooking energy from the heaters 114 applied to the crust area P' of the pizza P in comparison to the cooking energy applied to the uncovered central portions of the pizza P. While the particular reasons and manner in which the cover member 120 accomplishes this result are unknown it is believed that the cover member 120 may act in the nature of a filter similarly to the wire mesh screen 72 or, alternatively, may act to shield the crust area P' from the full impact of cooking energy emitted from the heaters 114 by absorbing a portion of the heat energy. In any event, it is contemplated that other suitable web-like or plate-like materials fabricated in the form of a cover member may operate equally well to achieve the desired result. It is also contemplated that the degree or amount to which the cover member 120 serves its intended energy modification purpose may be selectively adjusted by varying physical characteristics of the cover member 120, e.g., the material from which it is fabricated, the thickness of the top wall 122, the thickness and axial dimension of the axial wall 124, or alternatively omitting the axial wall 124 altogether. It is further contemplated that the problem of uniformly cooking different types of pizzas utilizing the same cooking apparatus 110 without changing its temperature and conveyor speed settings may be overcome by utilizing different cover members 120 for the differing types of pizzas to be cooked, thereby to make uniform the degree to which each different type of pizza is baked.

By way of example but without limitation, two alternative forms of cover members 126,128 are shown in FIGS. 15-18. The cover member 126 of FIGS. 15 and 16 has a continuous circular plate-like radial top wall 130 and an outer plate-like axial wall 132 depending perpendicularly from the perimeter of the top wall 130. The top wall 130 is thereby adapted to overlie in covering relation the entirety of the top surface of a pizza P, the top wall 130 having a circular area of perforations 134 predominantly over the central area of the top wall 130 corresponding to the central area of a pizza P covered by sauce, cheese and toppings, but having an unperforated outer annular area 136 corresponding to the untopped peripheral crust area P' of a pizza P. As will be thus understood, the top wall 130 of the cover member 126 is effective not only to modify the cooking energy applied to the crust area P' of a pizza P but also, to a lesser extent, the cooking energy applied to the top central area of the pizza P. As such, the cover member 126 is anticipated to be optimally suited for use in the cooking of a plain pizza topped only by tomato sauce and cheese but no other toppings.

The cover member 128 of FIGS. 17 and 18 is substantially identical in construction to the cover member 120 of FIGS. 13 and 14, except that the top wall 122 is formed with a plurality of circumferentially-spaced radial slots 138, which slots 138 are anticipated would be effective to selectively reduce the degree to which the cover member 120 modifies the cooking energy applied to a pizza's crust area P'. Of course, those persons skilled in the art will readily recognize from these examples that many and varied other embodiments of cover members are possible within the basic conceptual scope of the present invention.

In preliminary testing of the cover member 120 when baking pizzas made from a refrigerated pre-baked pizza bread dough base topped with a "deluxe" assortment of toppings, tomato sauce, cheese, and a combination of vegetable and meat toppings, it has been found that highly satisfactory uniformity in the baking of the pizza dough base and the toppings can be achieved without any burning of the pizza's peripheral crust area P' when operating the cooking apparatus 110 with its upper heater 114 adjusted to a set point temperature of 1,050° Fahrenheit and its bottom heater 114 adjusted to a set point temperature of 930° Fahrenheit and with the conveyor speed adjusted to transport the pizza P through the cooking zone 115 in an average cooking time of 3 minutes 45 seconds. Equally satisfactory results have been achieved utilizing the cover member 126 when baking plain cheese and tomato sauce-topped pizzas at the same apparatus settings. Those persons skilled in the art will readily recognize that this cooking time is well within a desirable range for fast food restaurant establishments, whereby the present invention accordingly would enable fast food restaurant establishments to provide a range of differing pizzas cooked to order on a quick-preparation basis competitive to more traditional hamburger, chicken and the like fast food restaurant establishments. It is contemplated that it may be possible to achieve further reductions in cooking time by initially pre-warming the pizza bread dough base.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention o otherwise to exclude any such other embodiments, adaptations, variations, modifications and equivalent arrangements, the present invention being limited only by the claims appended hereto and the equivalents thereof.

I claim:

1. Apparatus for cooking food products comprising means for generating cooking energy, means for supporting a food product in disposition to receive cooking energy from said generating means, and means for selectively modifying the cooking energy received by a predetermined portion of the food product to be subjected to a modified amount of cooking without correspondingly modifying the cooking energy received by other portions of the food product, said cooking energy modifying means comprising means for partially filtering cooking energy directed at the predetermined portion of the food product, said cooking energy modifying means being arranged to be out of contact with the food product.

2. Apparatus for cooking food products according to claim 1 and characterized further in that said cooking energy modifying means comprises means for modifying the cooking energy in a predetermined cooking area.

3. Apparatus for cooking food products according to claim 1 and characterized further in that said cooking energy modifying means comprises means for disposition between said generating means and the food product.

4. Apparatus for cooking food products according to claim 1 and characterized further in that said supporting means comprises means for conveying food products through a cooking area adjacent said generating means.

5. Apparatus for cooking food products according to claim 4 and characterized further in that said cooking energy modifying means comprises means associated with said generating means for modifying the cooking energy in a predetermined portion of said cooking area.

6. Apparatus for cooking food products according to claim 1 and characterized further in that said cooking energy modifying means comprises a generally flat web.

7. Apparatus for cooking food products according to claim 6 and characterized further in that said web comprises a mesh screen.

8. Apparatus for cooking food products according to claim 6 and characterized further in that said web comprises a plate.

9. Apparatus for cooking food products according to claim 1 and characterized further in that said cooking energy modifying means comprises means for disposition in covering relation to the predetermined portion of the food product.

10. Apparatus for cooking food products according to claim 9 and characterized further in that said covering means is of an annular configuration for covering a peripheral crust area of a pizza.

11. Apparatus for cooking food products according to claim 1 and characterized further in that said cooking energy modifying means is of an annular configuration corresponding to a peripheral crust area of a pizza.

12. A method for cooking food products comprising the steps of applying cooking energy to a food product and selectively modifying the cooking energy applied to a predetermined portion of the food product to be subject to a modified amount of cooking without contacting the food product and without correspondingly modifying the cooking energy received by other portions of the food product, said cooking energy modifying step comprising partially filtering cooking energy directed at the predetermined portion of the food product.

13. A method for cooking food products according to claim 12 and characterized further in that said cooking energy modifying step comprises modifying the cooking energy in a predetermined cooking area.

14. A method for cooking food products according to claim 12 and characterized further in that said cooking energy modifying step comprises interposing an energy modifying means between a source of the cooking energy and the food product.

15. A method for cooking food products according to claim 12 and characterized further by conveying food products through a cooking area.

16. A method for cooking food products according to claim 15 and characterized further in that said cooking energy modifying step comprises modifying the cooking energy in a predetermined portion of said cooking area.

17. A method for cooking food products according to claim 12 and characterized further in that said cooking energy modifying step comprises disposing a generally flat web between a source of the cooking energy and the food product.

18. A method for cooking food products according to claim 17 and characterized further in that said web comprises a mesh screen.

19. A method for cooking food products according to claim 17 and characterized further in that said web comprises a plate.

20. A method for cooking food products according to claim 12 and characterized further in that said cooking energy modifying step comprises covering the predetermined portion of the food product.

21. A method for cooking food products according to claim 20 and characterized further in that said covering step comprises covering a peripheral crust area of a pizza.

22. A method for cooking food products according to claim 12 and characterized further in that said cooking energy modifying step comprises covering a peripheral crust area of a pizza.

23. Means for preventing overcooking of a crust area of a pizza-type food product, comprising a cover member having a cover portion for disposition in covering relation to the crust area during cooking to partially filter cooking energy applied to the crust area in comparison to cooking energy applied to other portions of the pizza food product, said cover portion comprising a generally flat plate adapted to overlie the peripheral crust area of the pizza food product, said cover portion being arranged to be out of contact with the peripheral crust area of the pizza food product.

24. Means for preventing overcooking of a crust area of a pizza-type food product according to claim 23 and characterized further in that said cover portion is of an annular configuration to correspond to a peripheral crust area.

25. Means for preventing overcooking of a crust area of a pizza-type food product according to claim 23 and characterized further in that said cover portion has openings formed therein.

26. Means for preventing overcooking of a crust area of a pizza-type food product, comprising a cover member having a cover portion for disposition in covering relation to the crust area during cooking to partially filter cooking energy applied to the crust area in comparison to cooking energy applied to other portions of the pizza food product, said cover member having a secondary cover portion for disposition in covering relation to another area of the pizza-type feed product, said cover portion and said secondary cover portion being arranged to be out of contact with the pizza-type food product.

27. Means for preventing overcooking of a crust area of a pizza-type food product according to claim 26 and characterized further in that said secondary cover portion is perforated.

* * * * *